United States Patent
Curry et al.

[11] Patent Number: 6,053,764
[45] Date of Patent: Apr. 25, 2000

[54] PATCH PANEL AND INTERLOCKING MODULE

[75] Inventors: Richard Wynn Curry, Fountaintown; Timothy Charles Miller, Indianapolis, both of Ind.

[73] Assignee: Lucent Technologies Inc., Murray Hill, N.J.

[21] Appl. No.: 09/107,789

[22] Filed: Jun. 30, 1998

[51] Int. Cl.$^7$ .................................................. H01R 13/73
[52] U.S. Cl. .......................................... 439/557; 439/676
[58] Field of Search ........................... 439/557, 676, 439/76.1

[56] References Cited

U.S. PATENT DOCUMENTS

| | | | |
|---|---|---|---|
| 3,611,264 | 10/1971 | Ellis, Jr. .................................. | 339/99 R |
| 3,858,158 | 12/1974 | Henn et al. ............................ | 339/99 R |
| 4,168,974 | 9/1979 | Weidler et al. ......................... | 339/128 |
| 4,343,528 | 8/1982 | Lucius et al. .......................... | 339/198 G |
| 4,829,564 | 5/1989 | Jarvis ..................................... | 379/327 |
| 5,238,426 | 8/1993 | Arnett .................................... | 439/557 |
| 5,302,140 | 4/1994 | Arnett .................................... | 439/557 |
| 5,580,270 | 12/1996 | Pantland et al. ....................... | 439/676 |
| 5,600,746 | 2/1997 | Arnett .................................... | 385/53 |
| 5,639,261 | 6/1997 | Rutkowski et al. .................... | 439/534 |
| 5,700,167 | 12/1997 | Pharney et al. ........................ | 439/676 |

*Primary Examiner*—Michael L. Gellner
*Assistant Examiner*—Antoine Ngandjui

[57] ABSTRACT

A patch panel and a distribution module for mounting thereon has at least one aperture in the panel into which the module is fitted. The aperture has sloped latching surfaces on its upper and lower edges, and the front housing of the module has spring latches and latching tabs for mounting to the panel. A circuit board has spring blocks thereon, at least one of which engages a corresponding spring latch to prevent its becoming disengaged from the panel. A rear housing latches to the rear of the front housing to hold the circuit board in place therebetween. An identifying label holder is adapted to be affixed to the front of the front housing of the module.

12 Claims, 5 Drawing Sheets

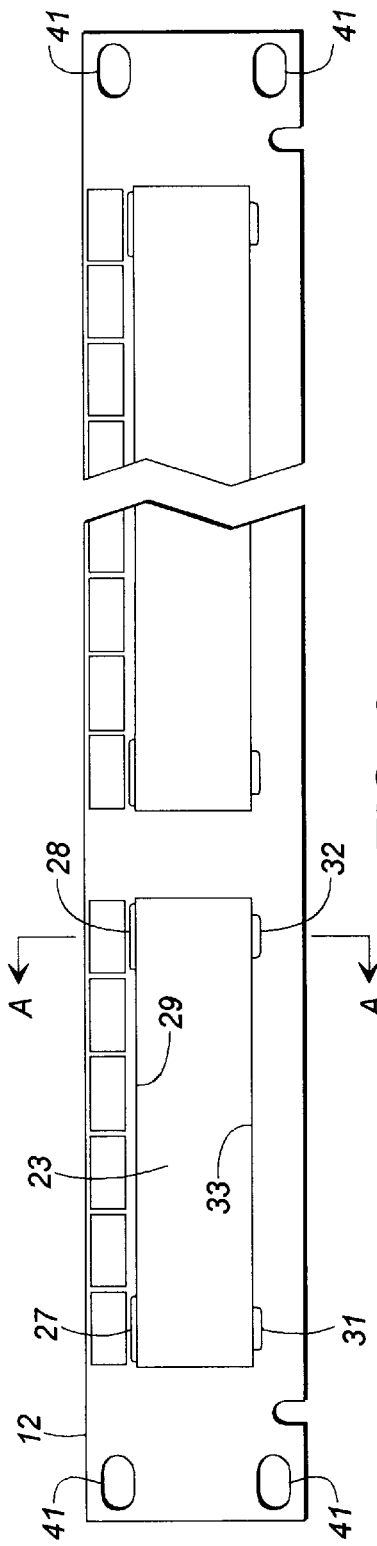
FIG. 2
FIG. 3
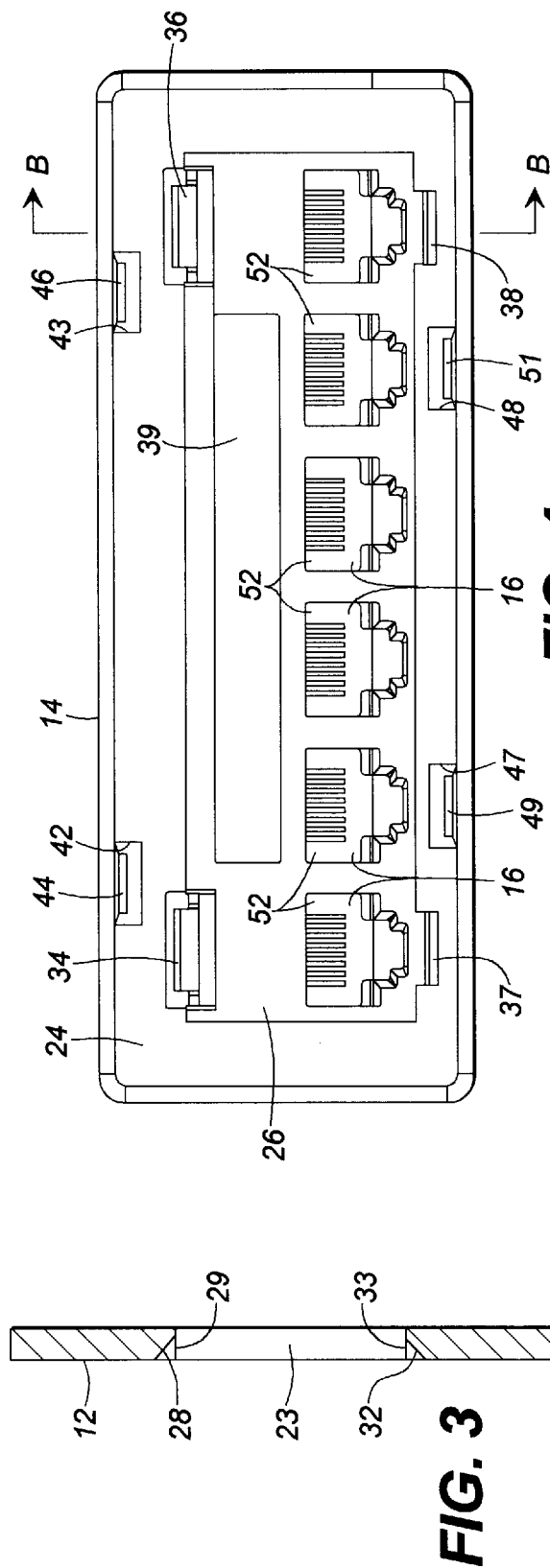
FIG. 4

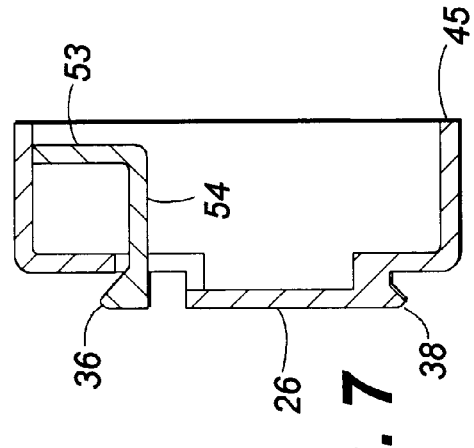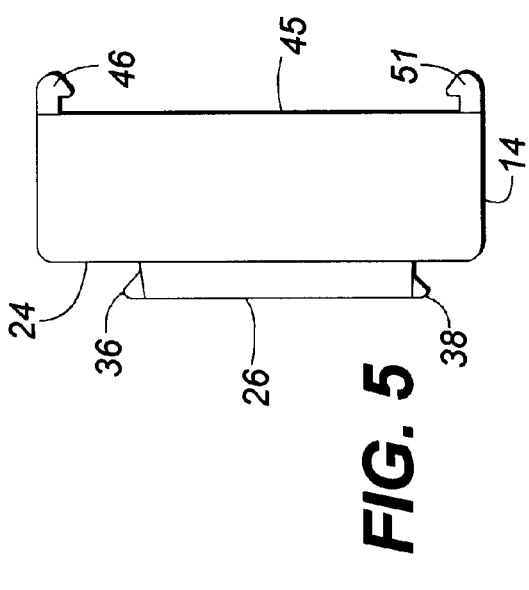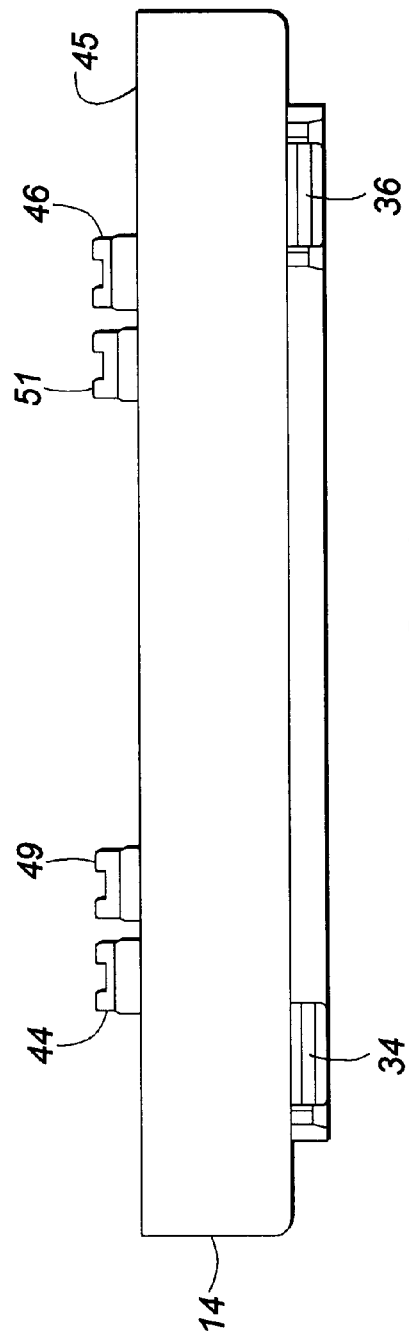

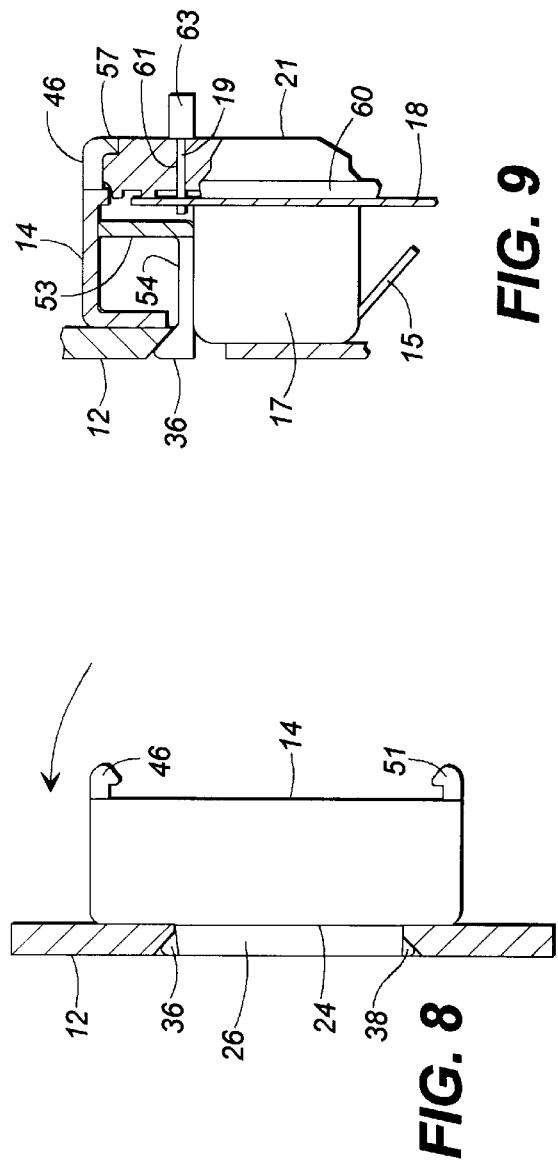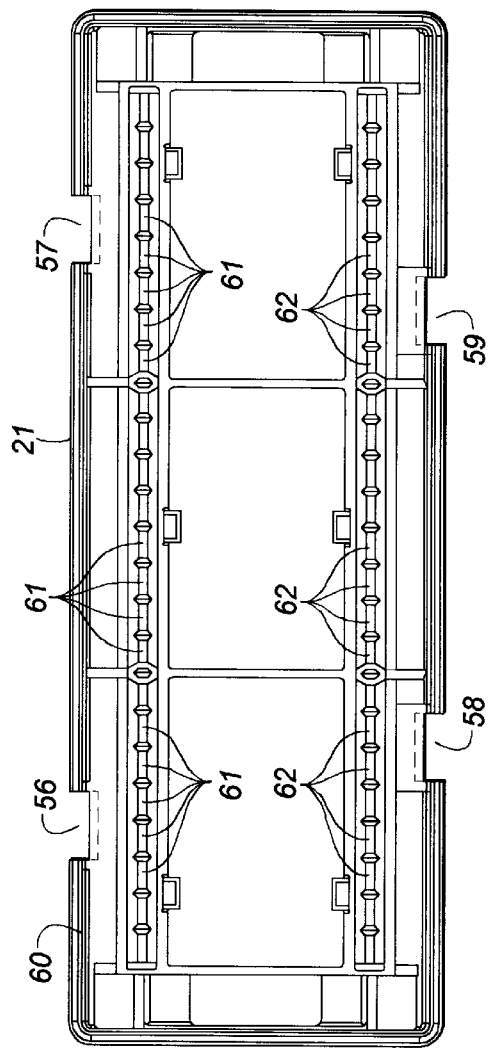

PATCH PANEL AND INTERLOCKING MODULE

FIELD OF THE INVENTION

This invention relates to a patch panel and distribution module for use, primarily, in local area networking for telephone systems.

BACKGROUND OF THE INVENTION

In local area networking for telephone systems, connections between transmission media are made through connectors mounted on patch panels. Typically, a patch panel includes a plate having an array of openings therein, in which are mounted connectors or, for high density applications, connector modules. Such patch panel and connector arrangements are used with optical fiber connectors, coaxial cable connectors, and copper wire modular connectors.

In local area networking and telecommunication hookups, especially in customer premises, it is often necessary to connect particular telephone or other apparatus such as computer lines which extend from a particular piece of equipment at a particular physical location to other equipment circuits which extend from, for example, a PBX or LAN network to a central switching facility. In the past, this cross-connection has been within the province of a telephone company craftsperson upon a customer's request. However, because of the changing nature of the telephone industry, with responsibilities being shifted more and more to the individual customer, it has become the practice to have the customers make their own telephone and equipment arrangements and hook-ups without reliance on the use of skilled personnel.

Such reliance upon the customer to make such hook-ups or cross-connections gives rise to numerous problems leading to efforts on the part of distribution hardware equipment manufacturers to simplify the process as much as possible. One problem has been the use of insulation displacement connectors (IDC) on the connector module in, for example, local area network (LAN) connecting or distribution fields, wherein the wires are forced between the blades of the IDC for both mechanical and electrical connection. Such an operation often requires both special tools and special skills, and presents a definite area for simplification. Also, the installation must be such that there is ready access to the connectors for performing the wiring operation. A second problem arises because typical cross-connect units must be individually secured to mounting surfaces. All of the wires involved must be routed, dressed, and connected properly, and usually present to the assembler an unintelligible mass of intertwined and often tangled wires.

One proposed solution to at least some of the foregoing problems is shown in U.S. Pat. No. 4,536,052 of Baker et al. In the arrangement of that patent, a modular cross-connect panel is designed to allow multi-conductor cables carrying a number of line circuits to be plugged into mating connectors. The connectors from the lines as well as from the stations are pre-wired to standard telephone jacks thereby allowing the customer to snap one end of a double plug-ended cord into the desired line jack and the other end of the cord into the desired station jack. The cross-connect comprises a housing having several hinged rotating section connector panels, each of which accepts multi-pair cables. The hinged section is mounted to a forward edge of a support section and the multi-pair cables are suspended between the two sections. Included in each section are a plurality of jacks arranged in groups, vertically spaced from each other. The individual cable pairs within the cable are connected to individual jacks and the double plug-ended path cords are then used to cross-connect individual stations with switching facility lines. The jacks are grouped in sets of six mounted on plug boards which are mounted on the panel by means of ramps molded on each of the individual jacks. Thus, the jacks, which are mounted on the board, retain the board within openings to the panel. The cables leading to the jacks from, for example, a PBX are each fitted with an end connector which, in turn, is adapted to plug into the rear of each set of six jacks. Such an arrangement necessitates a pre-wiring and connector mounting of the cables, which is beyond the normal competence of the customers, and which reduces the flexibility of the arrangement. Any changes that may be desired to be made to the jack connections can necessitate a rewired connector on the cable, which is undesirable from both a time and cost standpoint.

The use of the jacks to retain the plug board on the panel can cause problems inasmuch as, for secure mounting, each plug board must have a full complement of jacks. In addition, such an arrangement necessitates the use of jacks having ramps molded thereon rather than standard jacks which have no ramp.

A universal patch panel is shown in U.S. Pat. No. 5,238,426 of Arnett and in U.S. Pat. No. 5,302,140 of Arnett, wherein a panel has an array of a plurality of openings therein. Each opening is adapted to receive a mounting adapter of plastic material having first and second depressible cantilever beams, which function to hold the adapter within the opening. The adapter, in turn, has grooves in the interior side walls thereof for holding a connector having resilient tabs therein. Each individual connector is wired and then inserted into and locked within the adapter. This arrangement allows any of a number of different types of connectors to be individually mounted in the panel, provided each connector has resilient tabs for locking the connector in place within the adapter. When the panel contains a full complement of connectors so mounted, cross-connections among different connectors can easily be made from the front of the panel by the customer.

In both the Arnett and Baker et al. arrangements, the wiring of the connectors and, more particularly, the modules, is preferably performed by a skilled craftsperson, in addition to which the modules must be assembled and mounted on the patch panel by the craftsperson. Mounting the modules or connectors may, as in the Arnett arrangement, entail the use of a mounting adapter or, as is common in the prior art, the use of mounting screws. Additionally, it is common in the prior art to mount the front portion of the module to the front of the patch panel and the rear portion to the rear of the panel. Also, where the module includes a printed circuit board it is common to mount the board on stand-offs extending from the module housing.

It is desirable, for economic reasons, that there be a reduction in complexity of apparatus and of assembly time. In addition, where the panels are contained in locations of limited space, such as closets, it is desirable that the modular mounting occupy as little additional space as possible. Inasmuch as the subscriber is expected to operate the mounted panel, i.e., plug and unplug wires and cables, a neat appearance without a confusion of wires and connection would, likewise, be desirable.

SUMMARY OF THE INVENTION

The present invention is directed toward achieving the aforementioned desiderata, and comprises both a unique patch panel and a unique connector module.

In greater detail, the patch panel comprises a planar plate having a plurality of aligned rectangular apertures therein. Each aperture has four spaced and sloped latching surfaces adjacent the corners thereof, two on the upper edge of the aperture and two on the lower edge thereof. The panel itself may be mounted to a rack by a hinged mounting, as with the AT&T 1100 panel in current use, or it may simply be bolted to the rack, although that would limit access to the rear.

The distribution module of the present invention comprises a front housing having a plurality of aligned apertures therein for receiving standard modular plugs such as those forming the connectors for telephones and other equipment. The apertures extend through the housing to the rear thereof. The front face of the housing is stepped so that a first planar portion thereof containing the apertures is above the plane, a second planar portion thereof a distance approximately equal to the thickness of the panel. First and second spring latch members project from the housing and terminate flush with the front of the first planar portion. The spacing of the latches is the same as the spacing of the two top edge latching surfaces of the aperture in the panel, and the rectangular dimensions of the first planar portion are equal to those of the rectangular aperture in the panel. Projecting from the lower edge of the first planar portion are first and second projections or latching tabs spaced a distance equal to the spacing of the latching surfaces on the lower edge of the aperture in the panel.

The second component of the module comprises a printed wiring board having a linear array of connector jacks in the form of spring blocks which are a press fit into contact holes in the printed wiring board and which make electrical connections to the printed circuitry on the wiring board. The wire frames in the spring block depend at an angle from the nose or front thereof, and fit into slots in each of the apertures in the housing. Thus, when the array of spring blocks is pressed into the array of apertures in the housing from the rear thereof, the spring blocks and printed wiring board are held in their proper place. In addition, the spring blocks prevent actuating of the first and second spring latches, thereby locking the assembly in place. The rear face of the printed wiring board has a plurality of insulation displacement connectors extending therefrom.

The distribution module is completed by a rear housing having slots therein for receiving the insulation displacement connectors extending from the wiring board and includes fingers extending therefrom between which the connectors are located. The rear of the front housing has, on the upper rear edge thereof first and second spaced latching tabs, and third and fourth spaced latching tabs extending from the lower rear edge thereof. The rear housing has first and second spaced latching notches in the upper edge or side thereof, the spacing being equal to the spacing of the latching tabs extending from the upper rear edge of the front housing. Also, there are third and fourth spaced latching notches in the lower edge or side of the rear housing with the spacing thereof being equal to that of the tabs extending from the lower rear edge of the front housing. For proper orientation of the rear housing, the spacing along the upper side differs from that on the lower so that the rear housing cannot accidentally be mounted upside down.

In the mounting of the distribution module onto the patch panel, the latching tabs on the lower edge of the first planar portion of the front housing are mated with the latching surfaces of the lower edge of the rectangular apertures in the patch panel, and the housing is rotated forward until the upper spring latches engage the upper latching surfaces in the aperture, thereby latching, but not locking, the front housing in place. The spring blocks are then inserted into the apertures in the front housing and pressed forward to position them and the wiring board in place. The upper surface of each of the two spring blocks which is immediately under the corresponding spring latch, bears against the lower surface of the spring latch, to prevent it from being depressed, thereby locking the front housing to the patch panel. The rear housing is pressed forward to seat the insulation displacement connectors extending from the wiring board, and the rear housing is then latched in place by means of the latching tabs on the rear of the front housing, thus capturing and holding the wiring board in position. Wiring of the module can then be performed. Thus, complete assembly and mounting is achieved without the use of adapters, screws, or stand-offs, and the front face (first planar portion) of the module is flush with the front face of the patch panel, making for a neat, less confusing appearance.

The module is provided with a transparent elongated label holder which comprises a substantially closed U-shaped container for labels having a double sided foam adhesive tape extending along the length of one of the legs (the rear leg). The label holder is preferably made of a transparent plastic material such as transparent PVC or polycarbonate. The U-shape is substantially closed at what would normally be the open end, and the material of the label holder is sufficiently stiff so as to form an elongated pocket for the several labels, which cannot slip out.

The module and patch panel assembly of the invention has a minimum of parts, does not require adapters or mounting hardware, is easily assembled, is economical of space, and presents a neat appearance to the user, which in turn minimizes confusion. Other advantages and features of the present invention will be readily apparent from the following detailed description, read in conjunction with the accompanying drawings.

DESCRIPTION OF THE DRAWINGS

FIG. 2 is an elevation view of the patch panel involved in the invention;

FIG. 3 is a cross-sectional view of the patch panel along the line A—A of FIG. 2;

FIG. 4 is a front elevation view of the front housing of the distributor module of the present invention;

FIG. 5 is a side elevation view of the housing of the module of FIG. 4;

FIG. 6 is a top plan view of the housing of the module of FIG. 4;

FIG. 7 is a cross-section view of the housing of the module along the lines B—B of FIG. 4;

FIG. 8 is a partial cross-section view illustrating the mounting of the front housing of the module to the patch panel;

FIG. 9 is a partial cross-section view of the assembly of the patch panel and the distribution module;

FIG. 10 is a front elevation view of the rear housing of the distribution module;

DETAILED DESCRIPTION

Figure 1:
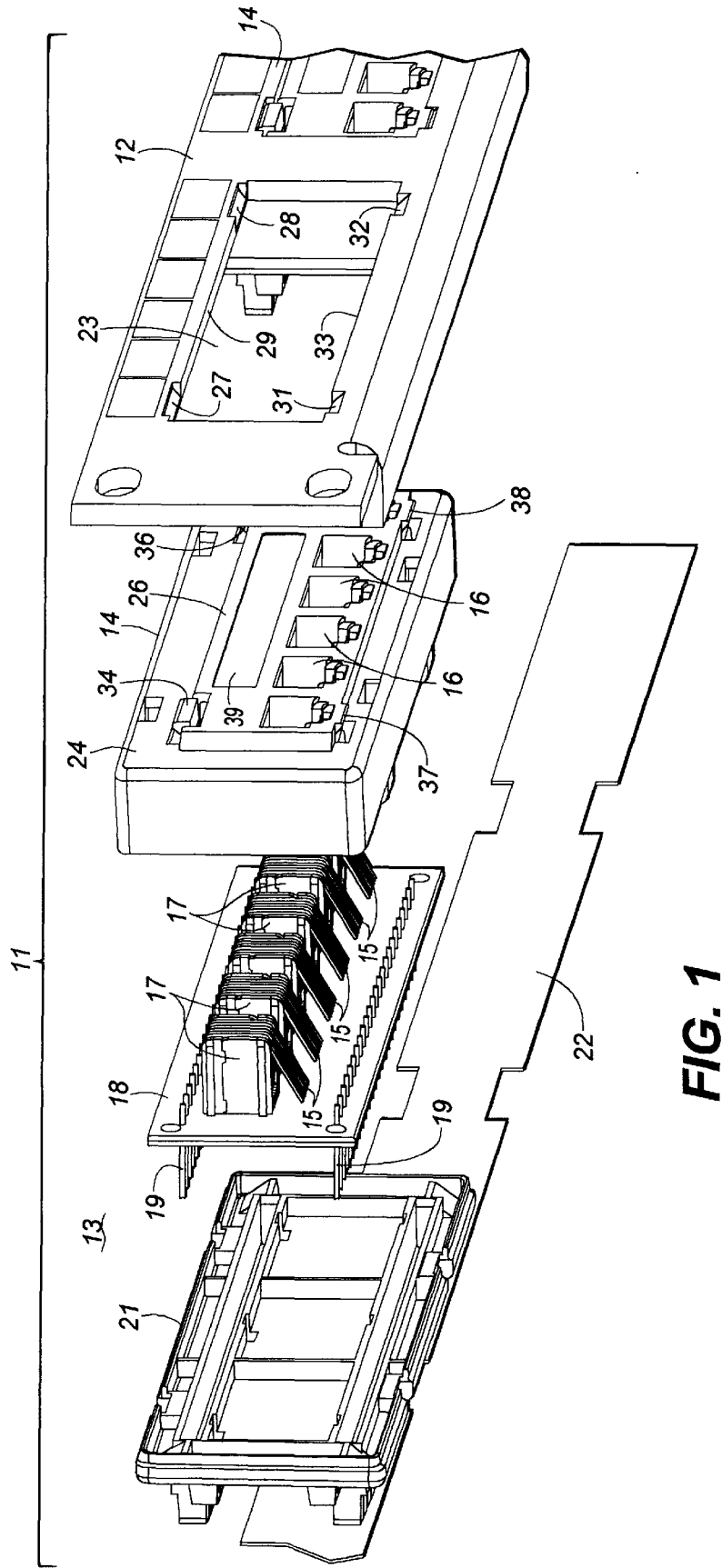
FIG. 1 is an exploded perspective view of the patch panel and interlocking module of the present invention.
Figure 11:
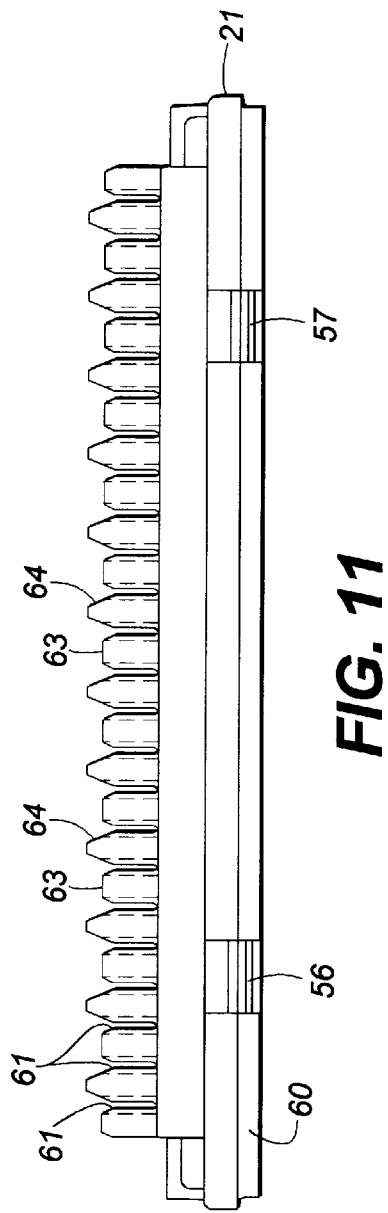
FIG. 11 is a top plan view of the housing of FIG. 10.

FIG. 1 is an exploded perspective view of the patch panel and interlocking module assembly 11 of a preferred embodiment of the present invention. Assembly 11 comprises a patch panel 12, only a portion of which is shown in FIG. 1 which is generally of metal, such as aluminum, and is configured for mounting on a rack, not shown, or other type of support structure. A patch panel distribution module 13 which is of a plastic material comprises a front housing 14 which has a plurality of apertures 16 therein for receiving standard modular plugs, not shown, and which is adapted, at the rear openings of apertures 16 to receive a plurality of connector jacks 17 in the form of dielectric spring blocks such as those shown and described in U.S. patent application Ser. No. 09/047,870 filed Mar. 25, 1998, of Pharney et al. or any of a number of other types of spring blocks. Depending at an angle from the front face of each jack are a plurality of individual wire leads, or springs 15. Spring blocks or connector jacks 17 have jack pins (not shown) extending from the rear thereof which are mounted on a circuit board 18 of suitable material and electrically connected thereto. Board 18 is, in turn, connected by suitable means such as insulation displacement connectors 19 to the associated circuitry which, in FIG. 1, is represented simply by a rear housing member 21 of the distribution module 13, and which contains such associated circuitry, such as wire or cable connectors. Also shown in FIG. 1 is a connector identifying strip 22 which may be heavy gauge paper or plastic, for example, and which fits on the rear of rear housing member 21.

As will be discussed in greater detail hereinafter, panel 12 has a plurality of apertures 23 therein, generally of rectangular shape, and the face 24 of front housing 14 has a rectangularly shaped raised portion 26 which fits snugly with the corresponding aperture 23. The depth of the raised portion 26 is approximately equal to the thickness of the panel 12 so that when housing 14 is inserted in the aperture 23 so that face 24 butts against the rear surface of panel 12, the surface of raised portion 26 is flush with the front surface of panel 12. In accordance with the present invention, each aperture 23 has first and second spaced and sloped latching surfaces 27 and 28 on the top edge 29 thereof, and third and fourth spaced and sloped latching surfaces 31 and 32 on the bottom edge 33 thereof. Front housing 14 has first and second spaced spring latches 34 and 36 whose spacing corresponds to the spacing of surfaces 27 and 28, and third and fourth fixed and spaced latching tabs 37 and 38 whose spacing corresponds to the spacing of surfaces 31 and 32. In practice and as will be discussed more fully hereinafter, spring latches 34 and 36 and latching tabs 37 and 38 function to hold front housing 14 in place within aperture 23. Raised portion 26 also has an area 39 for suitable labeling or otherwise identifying the individual connections for plugs to be inserted into apertures 16.

FIG. 2 is an elevation view of the front of the panel 12, showing the location of the upper sloped latching surfaces 27 and 28, and the lower sloped latching surfaces 31 and 32, and FIG. 3 is a cross-sectional side elevation view along the line A—A of FIG. 2 showing the sloped surfaces. Panel 12 also has, at the ends thereof, elongated mounting holes 41 for mounting panel 12 to a rack or other support arrangement, not shown.

FIG. 4 is a front elevation view of the front housing 14 of the distribution module 13, and FIGS. 5 and 6 are side elevation view and top plan view respectively thereof. Front face 24 of housing 14 has first and second spaced mold openings 42 and 43 in the top portion thereof, behind which are rearwardly extending latch hooks 44 and 46, which extend from the upper rear periphery of housing 14. Peripheral wall 45 defines a rear open area 50 for receiving and surrounding circuit boards 18. Along the lower edge of housing 14 are spaced mold openings 47 and 48 behind which are rearwardly extending latch hooks 49 and 51, which extend from the lower rear periphery of housing 14. As can be seen in FIG. 4, each of the openings or apertures 16 has a slotted rear wall 52, each slot of which is adapted to receive one of the angled leads 15 on the spring block 17 which fits into the rear of aperture 16. FIG. 7 is a cross-sectional view along the line B—B of FIG. 4, and shows the general configuration of the spring latches 34 and 36 and the fixed latching tabs 37 and 38. it can be seen that each spring latch (36 in FIG. 7) is cantilevered from a rear support wall 53 with its arm 54 extending toward the front of housing 14, terminating in latch 36 whose front face is flush with, or lies in the plane of, raised portion 26. Latching tabs 37 and 38 are preferably, although not necessarily, made integral with raised portion 26, as shown. With reference to FIG. 8, when front housing 14 is to be mounted to patch panel 12, latching tabs 37 and 38 are hooked over sloped surfaces 31 and 32, respectively, and housing 14 is then rotated in the direction of the arrow until spring latches 34 and 36 engage the sloped surfaces 27 and 28, and, because of their natural flexibility due to the cantilever mounting, snap into place, as shown in FIG. 8. Spring latches 34 and 36 may be made with slightly rounded leading edges to enable them to be cammed downward by the edges of the sloped surfaces 27 and 28 during mounting and just prior to their snapping upward into engagement with the surfaces.

In FIG. 9 there is shown, in cross-section, the front housing 14 and the circuit board 18 assembled for use, and the rear housing 21. In the assembly, the spring blocks 17 mounted on board 18 are pressed into the rear of the apertures 16 in front housing 14, and the slotted walls 52 separate leads 15 and maintained therein in proper position. The spring blocks 17 are each a snug fit in their corresponding aperture 16. As best seen in FIG. 4, the two end apertures 16 in front housing 14 are each directly below one of the spring latches 35 and 36. This positioning is essential to the particular manner in which front housing 14 (and module 13) is locked in place to panel 12. As best seen in FIG. 9, each spring block 17 that is inserted into one of these end apertures 16, as it is pushed forward into place, bears against the underside of the spring latch arm 54 of the corresponding spring latch 34 or 36. As a consequence, latches 34 and 36 are blocked from disengaging movement, downward as seen in FIG. 9, and hence the spring block 17 functions to lock housing 14, and module 13, to the panel 12. Thus, the spring blocks 17 in the two end apertures 16 are a part of the physical structure of the arrangement of the invention and performs a structural function in addition to their electrical function.

FIG. 10 is a front elevation view of rear housing member 21 which has, along its upper edge, latching notches 56 and 57 spaced to correspond to the spacing of latch hooks 44 and 46, for engagement with those hooks, and latching notches 58 and 59 spaced for engagement with latching hooks 49 and 51. Member 21 also has an upper array of slots 61 for receiving insulation displacement connectors 19, and a lower array of slots 62 for receiving insulation displacement connectors 19. A flange 60 extends around the front face of housing 21 and is dimensional to define an area slightly larger than circuit board 18 so that, when the module 13 is assembled, board 18 is partially nested within the flange area, as seen in FIG. 9 As best seen in FIG. 22, an upper and a lower array of spaced projecting members 63 and 64 extend from the rear face of member 21, and each slot, as shown by the dotted lines, extends through the members or fingers 63 and 64 so that the slot or space between members defines the location of the wires to be connected to the members 19. In assembly, the connectors 19 extending from board 18 are pressed into the slots 61 and 62 and through member 21 into the projections 63 and 64. Member 21 is pressed forward toward housing 14 until the hook latches 44, 46, 49, and 51 engage with their corresponding notches 56, 57, 58, or 59, thereby latching member 21 to housing 14 with the circuit board 18 being captured and held therebetween. This is illustrated in FIG. 9, where it can be seen that the member 21 butts against the rear surface of board 18. Spring blocks 17 are two held in their locking position and the module 13 is locked in position on panel 12 with the front face of the module 13 being flush with the front surface of the panel 12.

From the foregoing it can readily be seen that the patch panel assembly of the invention is readily assembled without the use of special adapters, bolts, screws, or stand-offs for the circuit board and requires a minimum of skill on the part of the installer or user. As pointed out, the entire system is simply snapped together.

Figure 13:
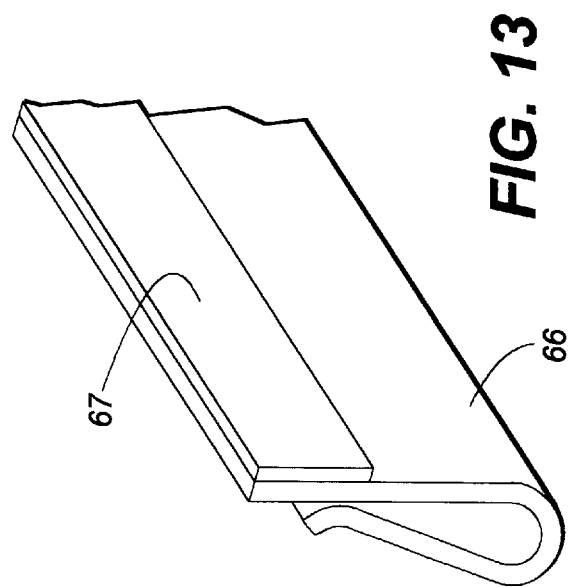
FIG. 13 is a perspective view of the label holder for use with the distribution module of the present invention.
Figure 12:
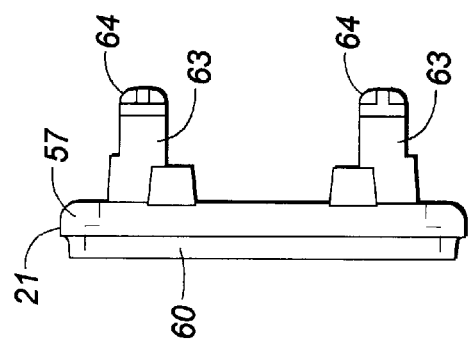
FIG. 12 is a side elevation view of the rear housing of FIG. 10.

In FIG. 13 there is shown a label holder 66 for use with the present invention, so that the various apertures 16 may be identified for the user. Holder 66 is in the form of a longitudinally extending closed U-shape preferably made of a transparent plastic such as PVC or a polycarbonate. The material is preferably sufficiently stiff to retain its closed shape, but not so stiff that it can't be pried open for insertion of identifying labels. Holder 66 can be mounted to the labeling area 39 by means of a strip of double sided foam adhesive tape 67, or by other switchable means.

In concluding the detailed description, it should be noted that it will be obvious to those skilled in the art that many variations and modifications may be made to the preferred embodiment without substantial departure from the principles of the present invention. All such variations and modifications are intended to be included herein as being within the scope of the present invention as set forth in the claims. Further, in the claims, the corresponding structures, materials, acts, and equivalents of all means or step plus function elements are intended to include any structure, material, or acts for performing the functions with other claimed elements as specifically claimed.

We claim:

1. A distribution cable module for engaging a separate structure, comprising:

a front housing having an array of a plurality of plug receiving apertures therein extending through said front housing from the front thereof toward the rear and a rear support member;

a circuit board having a front surface and a rear surface and a plurality of connector jacks mounted on said front surface and at least one array of connectors extending from said rear surface; said connector jacks being spaced to fit within said plug receiving apertures from the rear of said front housing;

a rear housing member having a front face and means on said front face defining an area for said circuit board;

said front housing having a front face and first and second spring latches that extend forwardly from said rear support member of said front housing toward said front face of said front housing for engaging the separate support structure; and locking members adapted to lock said module to the separate support structure to prevent disengagement of said spring latches from the separate support structure.

2. A distribution module as claimed in claim 1 wherein said front face of said front housing has a raised planar area having a top edge and a bottom edge.

3. A distribution module as claimed in claim 2 wherein each of said spring latches has a first end affixed to said rear support member, a forward extending arm, and a second, free, end, said arm of each of said spring latches having an underside, and said free end of each of said spring latches being substantially flush with the plane of said raised area at said top edge.

4. A distribution module as claimed in claim 3 wherein said locking members comprise the top surfaces of first and second connector jacks on said circuit board when said connector jacks are inserted into said plug receiving apertures from the rear thereof.

5. A distribution cable as claimed in claim 2 and further including first and second spaced latching tabs on said bottom edge of said raised planer area.

6. A distribution module as claimed in claim 5 wherein said first and second latching tabs are affixed to said raised planar area and are substantially flush with the plane of said raised area.

7. A distribution module as claimed in claim 1 wherein said front housing has a rearwardly extending peripheral wall having an upper edge and a lower edge and defining an open area for receiving said circuit board.

8. A distribution module as claimed in claim 7 and further including first and second spaced latch hooks extending from said upper edge rearwardly of siad front housing.

9. A distribution module as claimed in claim 8 and further including third and fourth spaced latch hooks extending from said lower edge rearwardly of said front housing.

10. A distribution module as claimed in claim 9 wherein the spacing between said first and second latch hooks is different than the spacing between said third and fourth latch hooks.

11. A distribution module as claimed in claim 10 wherein said rear housing member has first and second spaced latching notches on an upper edge of said front face of said rear housing member, the spacing of said first and second notches being equal to the spacing of said first and second latch hooks for engagement therewith.

12. A distribution module as claimed in claim 11 wherein said rear housing member has third and fourth spaced latching notches on a lower edge of said front face of said rear housing member, the spacing of said third and fourth notches being equal to the spacing of said third and fourth latch hooks for engagement therewith.

* * * * *